UNITED STATES PATENT OFFICE.

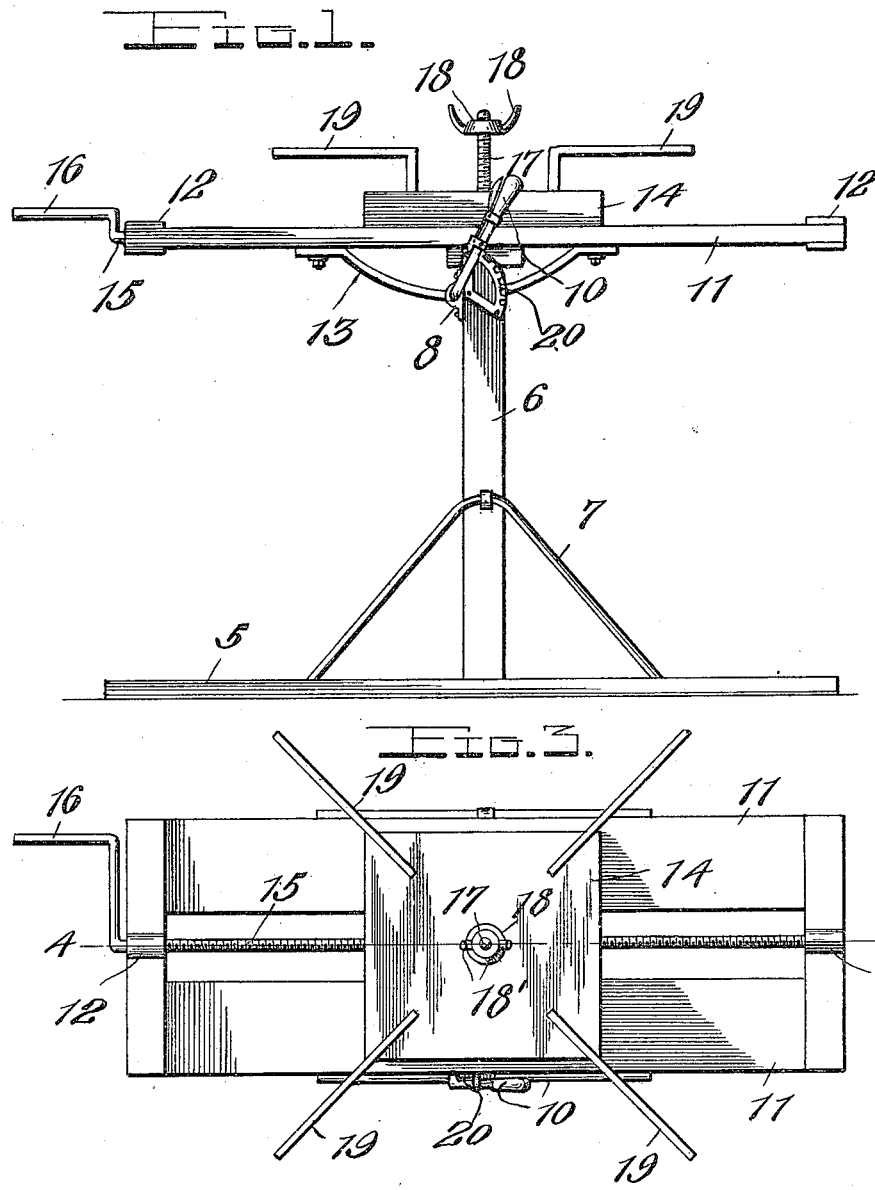

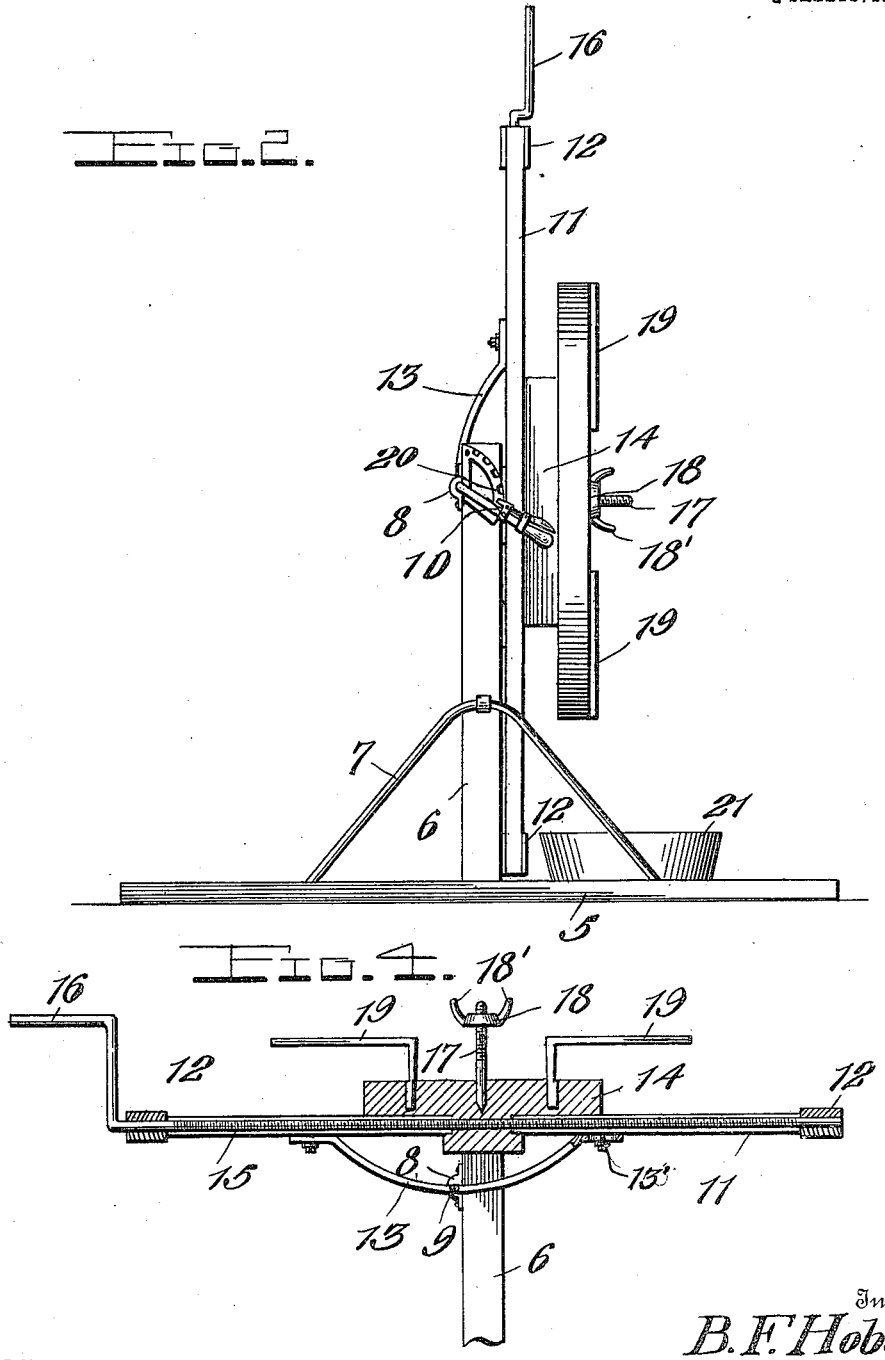

BENJAMIN F. HOBSON, OF RISON, ARKANSAS.

TIRE-SETTER.

993,995. Specification of Letters Patent. Patented May 30, 1911.

Application filed April 7, 1910. Serial No. 553,980.

*To all whom it may concern:*

Be it known that I, BENJAMIN F. HOBSON, a citizen of the United States, residing at Rison, in the county of Cleveland and State of Arkansas, have invented certain new and useful Improvements in Tire-Setters, of which the following is a specification, reference being had to the accompanying drawings.

This invention relates to certain new and useful improvements in tire setters and has for its object to provide a device of this character for holding a wagon wheel while the tire is being shrunk thereon.

Another object is to provide a tire setting device of simple construction and which may be readily adjusted and locked in position.

With these and other objects in view, the invention consists of the novel construction, combination and arrangement of parts, hereinafter fully described and claimed, and illustrated in the accompanying drawings, in which:—

Figure 1 is a side elevation of my improved tire setting device showing the same in position to receive the wheel; Fig. 2 is a similar view showing the device adjusted to vertically position the wheel so that the tire may be disposed in a water pan to cool the tire whereby the same is shrunk on the wheel; Fig. 3 is a top plan view of the device in its normal or horizontal position; and Fig. 4 is a section taken on the line 4—4 of Fig. 3.

Referring more particularly to the drawings, 5 indicates a base upon which are arranged the spaced vertical standards 6. These standards are braced and supported by means of the rods 7, which are secured thereto and to the base.

Bearings 8 are secured to the standards 6, adjacent to their upper ends and a transverse shaft 9 is mounted therein. One end of this shaft is provided with a handle 10, by means of which the same may be rotated to position the wheel. The wheel supporting table comprises two spaced parallel bars 11, which are connected together at their ends by the transverse bearing blocks 12. Each of the table bars 11 has secured to its under side a metal strip or rod 13, which is secured intermediate of its ends to the transverse shaft 9, while the ends of said bars are slotted to receive guide bolts 13' carried by the bars 11. These rods 13 are substantially semi-circular in form and it will be obvious that as they are rigidly secured to the shaft, as the shaft is rotated the table will be tilted with relation to the supporting standards 6.

A block 14 is slidably mounted upon the bars 11, and is formed with a neck portion depending between the same. The upper or head portion of this block extends over the upper surface of the table bars and the lower end of the neck portion is enlarged and engages over the opposed edges and beneath the said bars whereby the block is held beneath the table against vertical movement. This block is adjusted by means of a screw threaded shaft 15, which has threaded engagement through the neck portion of the block and is mounted in the bearing blocks 12, at each end of the table. One end of this shaft is formed with a crank handle 16, by means of which said shaft may be rotated and the block 14 moved to any desired position upon the table.

A spindle 17, is fixed in the center of the block said spindle having a clamping nut 18 threaded thereon provided with suitable handles 18' by means of which the same may be adjusted into clamping engagement with the wheel hub whereby the wheel is rigidly secured upon the slidable block 14. This block is also provided with the tire supporting rods which are spaced equi-distant from the central spindle 17. These rods are of substantially L-shaped form and are adapted to receive and support the metallic tire to arrange the same in position to be shrunk on the vehicle wheel. They are preferably of substantially L-shaped form and are keyed in the sliding block so that they may be readily removed when it is desired to use the device for other purposes, such as repairing the spokes of the wheel or providing the wheel with new spokes and for other similar purposes.

When the wheel is arranged upon the sliding block the table is disposed in horizontal position as shown in Fig. 1. After the wheel has been properly clamped in position, the handle 10 is trained to rotate the shaft 9 and move the table together with the block carried thereby and the wheel to a vertical position as shown in Fig. 2. The table is adapted to be locked in either its vertical or horizontal position by means of a rack segment 20, with the teeth of which a pawl carried by the handle 10 engages.

When it is desired to change the position of the table the pawl is disengaged from the rack teeth to release the handle when the same may be readily manipulated. After the tire has been shrunk upon the wheel, the block 14 may be adjusted upon the table by rotating the shaft 15, so that the wheel and tire may be raised and lowered to position the tire in water contained in a pan or other suitable receptacle 21 arranged beneath the wheel. The clamping nut 18 may then be loosened sufficiently to permit the wheel being rotated so as to expose all parts of the tire in the water whereby the tire may be readily cooled and then removed.

From the foregoing it will be seen that I have provided a tire setting device of comparatively simple construction which may be readily adjusted to arrange the wheel in proper position to quickly cool the tire.

The device is adapted to receive wheels of various diameters and when not in use as a tire setting device it may be advantageously used for many other desirable purposes.

The device is of light construction but strong and durable and is also very efficient in use.

While I have particularly set forth the preferred form of the invention, it will be understood that the same is susceptible of many minor modifications without departing from the essential features or sacrificing any of the advantages thereof.

What is claimed is:—

The herein described tire setting device comprising a base and vertical parallel standards mounted thereon, longitudinal parallel bars mounted upon the upper ends of said standards and rigidly connected together at their ends, a shaft rotatably mounted in bearings upon the upper ends of the standards and having a crank on one end, a bowed rod rigidly fixed at its ends to the under side of each of said bars, said rods being rigidly secured intermediate of their ends to said shaft, a block longitudinally movable upon said parallel bars and having a neck portion extending between the same, means mounted in the connecting members at the ends of said parallel bars and extending through the neck portion of said block to move the block upon said bars, and a device arranged upon the upper end of one of the standards to engage the crank on the end of said shaft and hold the parallel bars in a vertical or horizontal position with relation to said standards.

In testimony whereof I hereunto affix my signature in the presence of two witnesses.

BENJAMIN F. HOBSON.

Witnesses:
R. C. SEARCY,
BENJAMIN Y. SEARCY.

---

Copies of this patent may be obtained for five cents each, by addressing the "Commissioner of Patents, Washington, D. C."